(12) United States Patent
Han et al.

(10) Patent No.: US 11,548,410 B2
(45) Date of Patent: Jan. 10, 2023

(54) SEAT CONTROL SYSTEM FOR VEHICLE

(71) Applicants: HYUNDAI MOTOR COMPANY, Seoul (KR); KIA MOTORS CORPORATION, Seoul (KR)

(72) Inventors: Jong Seok Han, Seoul (KR); Seon Chae Na, Yongin-si (KR); Hyun Kyu Moon, Hwaseong-si (KR); Chan Ho Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 301 days.

(21) Appl. No.: 17/071,182

(22) Filed: Oct. 15, 2020

(65) Prior Publication Data

US 2021/0114487 A1 Apr. 22, 2021

(30) Foreign Application Priority Data

Oct. 22, 2019 (KR) ........................ 10-2019-0131021

(51) Int. Cl.
| | |
|---|---|
| *B60N 2/02* | (2006.01) |
| *B60N 2/16* | (2006.01) |
| *B60N 2/10* | (2006.01) |
| *B60N 2/00* | (2006.01) |

(52) U.S. Cl.
CPC .......... *B60N 2/0244* (2013.01); *B60N 2/002* (2013.01); *B60N 2/0232* (2013.01); *B60N 2/10* (2013.01); *B60N 2/161* (2013.01); *B60N 2002/0268* (2013.01)

(58) Field of Classification Search
CPC .... B60N 2/0244; B60N 2/002; B60N 2/0232; B60N 2/10; B60N 2/161; B60N 2/0224; B60N 2/1635; B60N 2/164; B60N 2002/0268; B60N 2002/024
USPC ............................................................ 701/49
See application file for complete search history.

(56) References Cited

U.S. PATENT DOCUMENTS

| | | | | |
|---|---|---|---|---|
| 5,979,985 | A * | 11/1999 | Bauer ................. | B60N 2/1695 |
| | | | | 297/340 |
| 6,966,598 | B2 * | 11/2005 | Schmale .............. | B60N 2/1864 |
| | | | | 296/65.05 |
| 7,140,682 | B2 * | 11/2006 | Jaeger .................. | B60N 2/181 |
| | | | | 297/344.15 |
| 8,047,596 | B2 * | 11/2011 | Jungert ................ | B60N 2/1814 |
| | | | | 296/65.09 |
| 8,616,645 | B2 * | 12/2013 | Ito ........................ | B60N 2/1842 |
| | | | | 297/344.17 |

(Continued)

FOREIGN PATENT DOCUMENTS

| | | |
|---|---|---|
| JP | S59-114052 U | 8/1984 |
| JP | H01-114838 U | 8/1989 |
| JP | 2002-345589 A | 12/2002 |

(Continued)

*Primary Examiner* — Mark R Wendell
(74) *Attorney, Agent, or Firm* — Morgan, Lewis & Bockius LLP (57) ABSTRACT

The present disclosure provides a seat control system for a vehicle, which may sense whether passengers have been seated on a front seat and a rear seat, and easily implement sleep and rest postures of the front seat and the rear seat through the height adjustment, the reclining adjustment, and the like of the front seat and the rear seat according to the sensed result.

15 Claims, 8 Drawing Sheets

(56) References Cited

U.S. PATENT DOCUMENTS

10,933,770 B2 * 3/2021 Goto .................... B60N 2/10

FOREIGN PATENT DOCUMENTS

| JP | 2003-040002 A | 2/2003 |
| JP | 2015-081060 A | 4/2015 |

* cited by examiner

SEAT CONTROL SYSTEM FOR VEHICLE

CROSS-REFERENCE TO RELATED APPLICATION

This application claims under 35 U.S.C. § 119(a) the benefit of priority to Korean Patent Application No. 10-2019-0131021 filed on Oct. 22, 2019, the entire contents of which are incorporated herein by reference.

TECHNICAL FIELD

The present disclosure relates to a seat control system for a vehicle, and more particularly, to a seat control system for a vehicle, which may easily implement sleep and rest postures of a front seat and a rear seat, according to whether passengers have been seated on the front seat and the rear seat.

BACKGROUND

In general, a front seat and a rear seat are mounted inside a vehicle while maintaining a predetermined front and rear interval, and the front seat and the rear seat also include a reclining device capable of adjusting the angle of a seatback.

If a passenger seated on the front seat performs the reclining operation to recline a front seatback backward, the front seatback contacts the knee of the passenger seated on the rear seat or the space capable of placing the knee and legs becomes narrow, and as a result, the passenger seated on the rear seat may feel uncomfortable.

Further, if the distance between the front seat and the rear seat is narrow, as the space capable of extending the feet and legs of the passenger seated on the rear seat becomes narrow, the inconvenience of the passenger seated on the rear seat may be increased.

The above information disclosed in this Background section is only for enhancement of understanding of the background of the disclosure, and accordingly, it may contain information that does not form the prior art that is already known in this country to a person of ordinary skill in the art.

SUMMARY OF THE DISCLOSURE

The present disclosure is intended to solve the above problem, and an object of the present disclosure is to provide a seat control system for a vehicle, which may sense whether passengers have been seated on a front seat and a rear seat, and easily implement sleep and rest postures of the front seat and the rear seat through the height adjustment of the front seat and the rear seat, the reclining adjustment, and the like according to the sensed result.

For achieving the object, the present disclosure provides a seat control system for a vehicle including a first actuator hinge-connected between a floor panel and a front bottom surface of a front seat cushion; a second actuator hinge-connected between the floor panel and the first actuator; a third actuator connected between a back bottom surface of the front seat cushion and the floor panel; a first link hinge-connected between the floor panel and a front bottom surface of a rear seat cushion; a second link hinge-connected between the floor panel and a back bottom surface of the rear seat cushion; a fourth actuator connected to deliver rotational power to a hinge shaft of the second link; and a control module for sensing whether passengers have been seated on a front seat and a rear seat, and driving and controlling one or more among the first to fourth actuators for a height adjustment, a reclining adjustment, or a tilting operation of one or more of the front seat and the rear seat according to the sensed result.

The first actuator is composed of a first cylinder body, a first piston embedded to be movable forward and backward in the first cylinder body to be hinge-fastened to the front bottom surface of the front seat cushion, a first motor mounted to the first cylinder body to provide a forward and backward driving force to the first piston, and a support link branched from a lower portion of the first cylinder body to be hinge-fastened to the floor panel.

The second actuator is composed of a second cylinder body hinge-fastened to the floor panel, a second piston embedded to be movable forward and backward in the second cylinder body to be hinge-fastened to the first cylinder body of the first actuator, and a second motor mounted to the second cylinder body to provide a forward and backward driving force to the second piston.

The third actuator is composed of a third cylinder body hinge-fastened to the floor panel, a third piston embedded to be movable forward and backward in the third cylinder body to be hinge-fastened to the back bottom surface of the front seat cushion, and a third motor mounted to the third cylinder body to provide a forward and backward driving force to the third piston.

The fourth actuator is adopted as a motor mounted to the floor panel to deliver the rotational power to the hinge shaft of the second link.

The control module includes a first passenger sensing sensor mounted to the front seat to sense whether a first passenger has been seated thereon; a first seat posture sensing sensor for sensing a current posture of the front seat; a second passenger sensing sensor mounted to the rear seat to sense whether a second passenger has been seated thereon; a second seat posture sensing sensor for sensing a current posture of the rear seat; and a seat controller for driving and controlling one or more among the first to fourth actuators for the height adjustment, the reclining adjustment, and the tilting operation of one or more of the front seat and the rear seat based on sensing signals of the first and second passenger sensing sensors and sensing signals of the first and second seat posture sensing sensors, after receiving an input signal of a front seat rest mode switch or a rear seat rest mode switch.

Preferably, the first and second passenger sensing sensors are adopted as a seat belt wearing sensing sensor for sensing whether to wear a seat belt.

Preferably, the first and second seat posture sensing sensors are adopted as hall sensors included in the motors of the first to fourth actuators.

In a simultaneous rest mode of the front seat and the rear seat, the seat controller is configured to control, for lifting the front seat, an operation in which a first piston of the first actuator moves forward, an operation of angularly rotating while the first actuator is pushed backward by the forward movement of a second piston of the second actuator, and an operation of angularly rotating forward while a third piston of the third actuator moves forward, to control a one-way rotational driving of the fourth actuator so that the first link is reclined backward while the second link is reclined backward for lowering the rear seat, and to control a reclining operation of a front seatback of the front seat and a rear seatback of the rear seat.

Further, in a single rest mode of the front seat in a state where the second passenger has not been seated on the rear seat, the seat controller is configured to control only a reclining operation of a front seatback of the front seat.

Further, in a single rest mode of the front seat in a state where the second passenger has been seated on the rear seat, the seat controller is configured to control, for lifting the front seat, a forward movement operation of a first piston of the first actuator, an operation of angularly rotating while the first actuator is pushed backward by the forward movement of a second piston of the second actuator, and an operation of angularly rotating forward while a third piston of the third actuator moves forward, to control a reclining operation of a front seatback of the front seat, and to control a one-way rotational driving of the fourth actuator so that the first link is reclined backward while the second link is reclined backward for lowering the rear seat.

Further, in a single rest mode of the rear seat in a state where the first passenger has not been seated on the front seat, the seat controller is configured to control, for forward tilting the front seat, a backward movement operation of the first piston of the first actuator, an operation of angularly rotating while the first actuator is pushed forward by the backward movement of the second piston of the second actuator, and an operation of angularly rotating forward while the third piston of the third actuator moves forward and to control a reclining operation of a rear seatback of the rear seat.

Further, in a single rest mode of the rear seat in a state where the first passenger has been seated on the front seat, the seat controller is configured to control, for lifting the front seat, a forward movement operation of a first piston of the first actuator, an operation of angularly rotating while the first actuator is pushed backward by the forward movement of a second piston of the second actuator, and an operation of angularly rotating forward while a third piston of the third actuator moves forward, and to control a reclining operation of a rear seatback of the rear seat.

Preferably, the seat controller is configured to perform a control of returning the front seat and the rear seat from the rest mode postures to original postures, in the case of receiving destination arrival information of the vehicle.

The present disclosure provides the following effects through the above-described configuration.

Firstly, the passengers seated on the front seat and the rear seat may comfortably take the sleep and rest postures at the same time.

Secondly, even if the reclining of the front seatback is performed in the state where the passengers have been seated on the front seat and the rear seat, it is possible to lower the rear seat while the front seat lifts, thereby providing the convenience capable of widely securing the space capable of extending the feet and legs of the passenger seated on the rear seat.

Thirdly, if the passenger takes the rest posture of the rear seat in the state where the passenger has not been seated on the front seat, it is possible to tilt the front seat forward, thereby providing the convenience capable of widely securing the space capable of extending the feet and legs of the passenger seated on the rear seat.

It is understood that the term "vehicle" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, preferred embodiments of the present disclosure will be described in detail with reference to the accompanying drawings.

Figure 1:
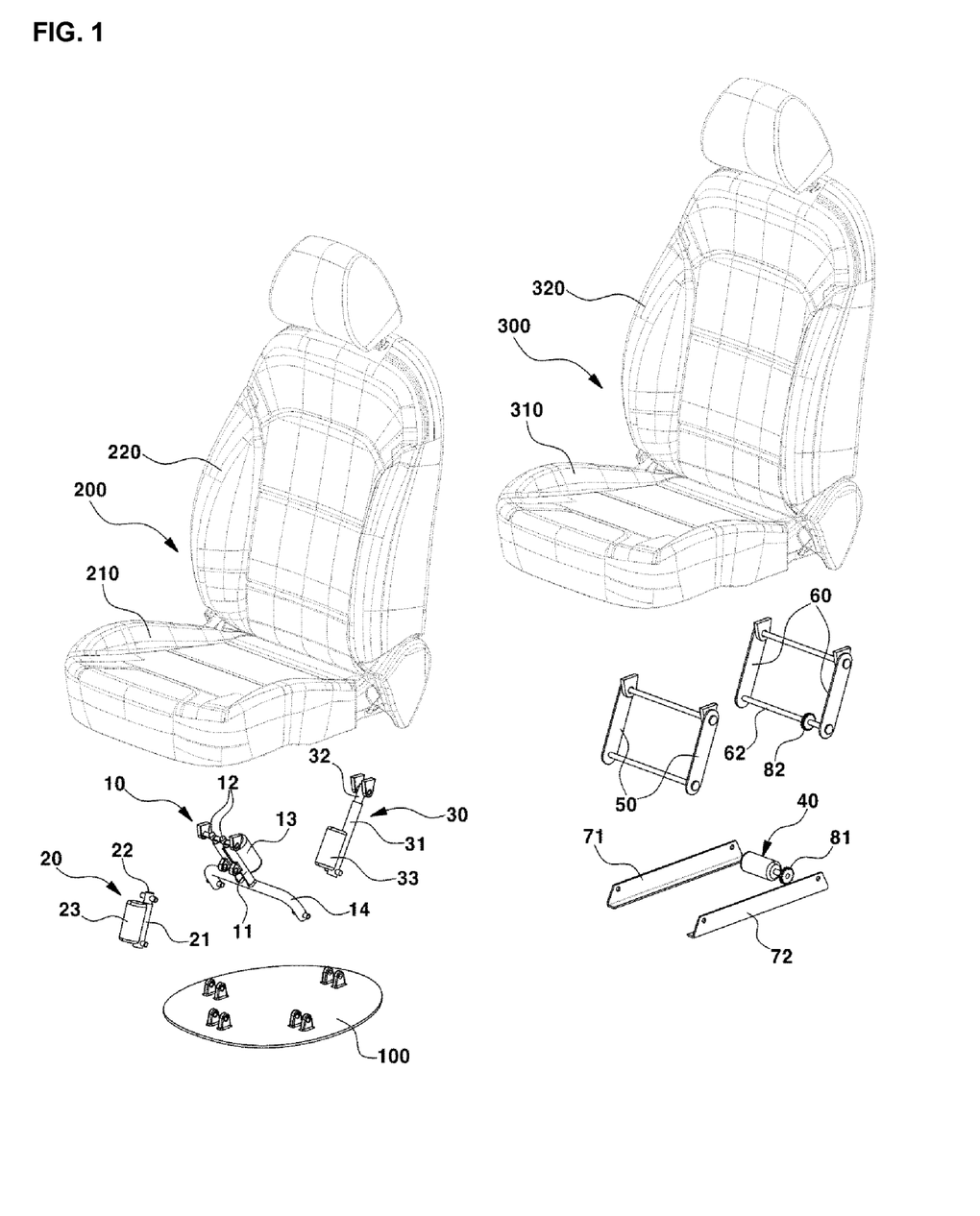
FIG. 1 is an exploded perspective view illustrating seat components applied to a seat control system according to the present disclosure.
Figure 2:
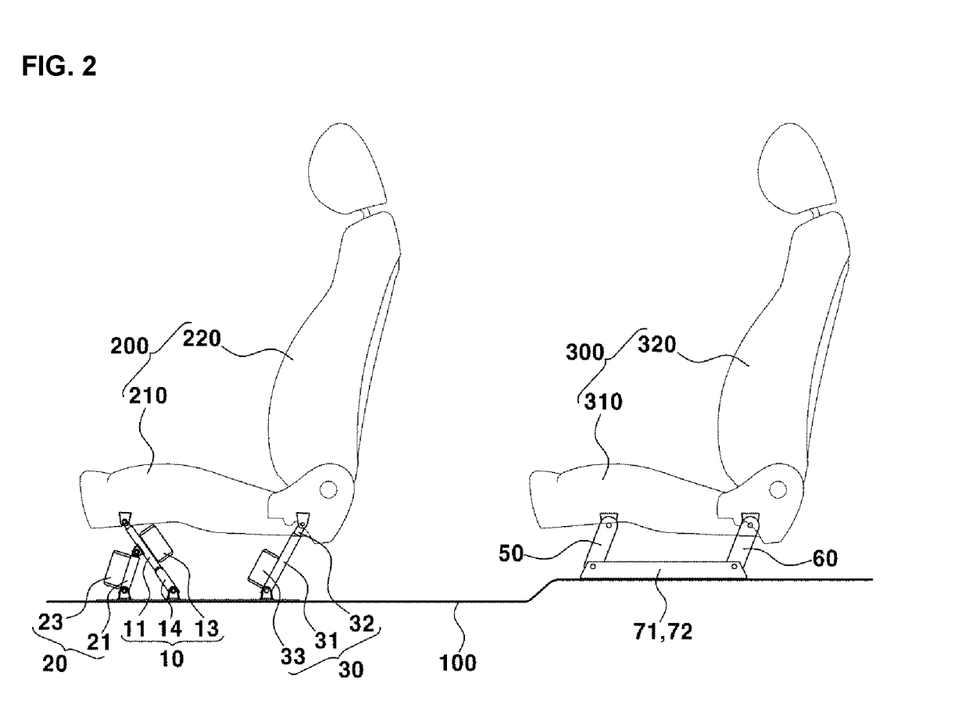
FIG. 2 is a side view illustrating the assembled state of the seat components illustrated in FIG. 1.

FIG. 1 is a perspective view illustrating seat components applied to a seat control system according to the present disclosure, and FIG. 2 is a side view illustrating the assembled state of each seat component.

As illustrated in FIGS. 1 and 2, first, second, and third actuators 10, 20, 30 are connected between a floor panel 100 and a front seat cushion 210.

The first actuator 10 may be hinge-connected between the floor panel 100 and the front bottom surface of the front seat cushion 210, and arranged to be upward inclined toward the front or arranged to be upright vertically.

In this case, the first actuator 10 is composed of a first cylinder body 11, a first piston 12 embedded in the first cylinder body 11 to be movable forward and backward, a first motor 13 mounted to the first cylinder body 11 to provide a forward and backward driving force to the first piston 12, and a support link 14 branched from the lower portion of the first cylinder body 11 to be hinge-fastened to the floor panel 100.

Preferably, the lower portion of the first cylinder body 11 of the first actuator 10 is fixedly mounted to the support link 14 by a method such as welding, and the first piston 12 is hinge-fastened to the front bottom surface of the front seat cushion 210.

The second actuator 20 is connected between the floor panel 100 and the first actuator 10.

The second actuator 20 is composed of a second cylinder body 21, a second piston 22 embedded in the second cylinder body 21 to be movable forward and backward, and a second motor 23 mounted to the second cylinder body 21 to provide a forward and backward driving force to the second piston 22.

The lower portion of the second cylinder body 21 of the second actuator 20 thus provided is hinge-fastened to the floor panel 100, and the front end portion of the second piston 22 is hinge-fastened to the first cylinder body 11 of the first actuator 10.

In this case, the second actuator 20 is arranged to be upward inclined toward the back unlike the first actuator 10.

The third actuator 30 is connected between the floor panel 100 and the back bottom surface of the front seat cushion 210.

Likewise, the third actuator 30 is composed of a third cylinder body 31, a third piston 32 embedded in the third cylinder body 31 to be movable forward and backward, and a third motor 33 mounted to the third cylinder body 31 to provide a forward and backward driving force to the third piston 32.

Therefore, the lower portion of the third cylinder body 31 is hinge-fastened to the floor panel 100, and the third piston 32 is hinge-fastened to the back bottom surface of the front seat cushion 210.

In this case, the third actuator 30 is arranged to be upward inclined toward the back like the second actuator 20.

Although the first to third actuators 10, 20, 30 have been described as the general electric cylinder having a mechanism for delivering a driving force of the motor to the piston, it should be noted that a hydraulic cylinder or a pneumatic cylinder, which may move the piston forward and backward, may alternatively be used.

Further, a pair of first links 50 is hinge-connected between the floor panel 100 and the front bottom surface of the rear seat cushion 310, and a pair of second links 60 is hinge-connected between the floor panel 100 and the back bottom surface of the rear seat cushion 310 to be arranged to be upward inclined toward the back.

In this case, a first bracket 71 and a second bracket 72 that are elongated along the longitudinal direction of the vehicle are fixedly mounted to the floor panel 100.

Therefore, the upper end portion of the first link 50 is hinge-fastened to the front bottom surface of the rear seat cushion 310 and at the same time, the lower end portion thereof is hinge-fastened to the front end portions of the first and second brackets 71, 72; and the upper end portion of the second link 60 is hinge-fastened to the back bottom surface of the rear seat cushion 310 and at the same time, the lower end portion thereof is hinge-fastened to the back end portions of the first and second brackets 71, 72.

Further, a hinge shaft 62 of the second link 60, that is, the hinge shaft 62 for connecting between the lower end portions of the pair of second links 60, is connected with a fourth actuator 40 for delivering rotational power to the second link 60.

For example, a motor adopted as the fourth actuator 40 is fixedly mounted to the floor panel, a drive gear 81 is mounted to the axis of the motor, and a driven gear 82 engaged with the drive gear 81 may be mounted to the hinge shaft 62 of the second link 60.

Therefore, the rotational power of the motor, which is the fourth actuator 40, is delivered to the driven gear 82 through the drive gear 81, such that the second link 60 may rotate, and the first link 50 may also rotate together with the rotation of the second link 60.

Figure 3:
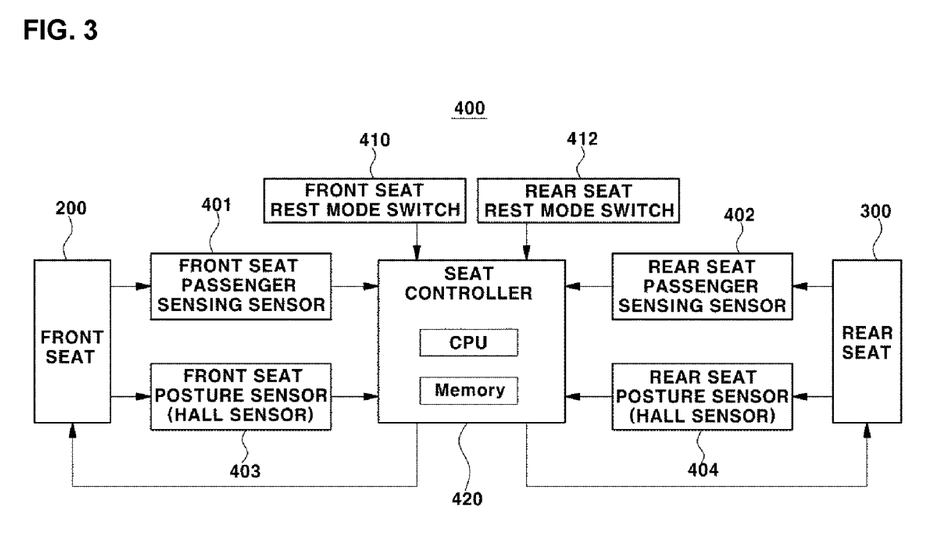
FIG. 3 is a control block diagram illustrating a control module of the seat control system according to the present disclosure.

FIG. 3 is a control block diagram illustrating a control module of the seat control system according to the present disclosure.

The seat control system of the present disclosure is configured to include a control module 400 for sensing whether the passengers have been seated on a front seat 200 including the front seat cushion 210 and a front seatback 220 and a rear seat 300 including the rear seat cushion 310 and a rear seatback 320, and optionally driving and controlling one or more among the first to fourth actuators 10, 20, 30, 40 for the height adjustment, the reclining adjustment, and the tilting operation for the front seat 200 and the rear seat 300 according to its sensed result.

As illustrated in FIG. 3, the control module 400 is implemented as a sensor for providing passenger seated information and seat posture information to a seat controller 420, and includes a first passenger sensing sensor 401 (e.g., a front seat passenger sensing sensor) mounted to the front seat 200 to sense whether the passenger has been seated thereon, a first seat posture sensing sensor 403 (e.g., a front seat posture sensor) for sensing a current posture of the front seat 200, a second passenger sensing sensor 402 (e.g., a rear seat passenger sensing sensor) mounted to the rear seat 300 to sense whether the passenger has been seated thereon, and a second seat posture sensing sensor 404 (e.g., a rear seat posture sensor) for sensing a current posture of the rear seat 300.

Further, the control module 400 includes a switch for confirming the rest mode intention of the passenger, and also includes a front seat rest mode switch 410 and a rear seat rest mode switch 412.

In particular, the control module 400 includes the seat controller 420 for optionally driving and controlling one or more among the first to fourth actuators 10, 20, 30, 40 for the height adjustment of the front seat 200 and the rear seat 300, the reclining adjustment of the seatback, the tilting operation of the front seat, and the like based on sensing signals of the first and second passenger sensing sensors 401, 402, and sensing signals of the first and second seat posture sensing sensors 403, 404, after receiving the input signals of the front seat rest mode switch 410 and the rear seat rest mode switch 412.

Preferably, the first and second passenger sensing sensors 401, 402 may be adopted as a seat belt wearing sensing sensor called a Seat Belt Reminder (SBR) for sensing whether to wear the seat belt, or adopted as a body pressure sensor embedded in the front seat and the rear seat.

Preferably, the first and second seat posture sensing sensors 403, 404 may be adopted as a hall sensor included in the motors of the first to fourth actuators 10, 20, 30, 40, and a hall sensor included in the motor of the general reclining device for reclining the front seatback and the rear seatback.

For reference, the hall sensor is a known sensor mounted to the motor to sense the current rotational driving amount of the motor.

Therefore, the hall sensor senses the rotational driving amount of the motor included in the first to fourth actuators 10, 20, 30, 40 and the rotational driving amount of the motor included in the reclining device to transmit the rotational driving amount to the seat controller 420, such that the seat controller 420 may confirm information such as the height, the reclining angle, the tilting angle, and the like of the current seat to know the current posture of the seat.

Here, the operation flow of the seat control system according to the present disclosure composed of the above configuration will be described as follows.

Figure 4:
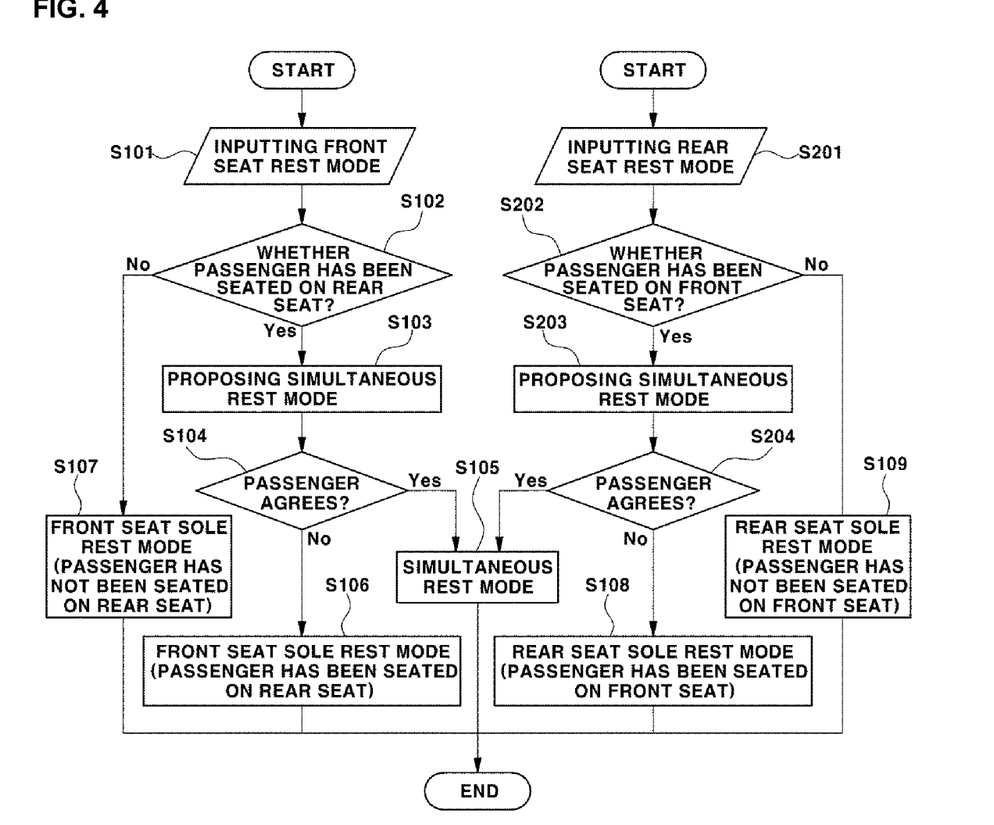
FIGS. 4 and 5 are flowcharts illustrating a control process of the seat control system according to the present disclosure.

FIG. 4 is a flowchart illustrating a control process of the seat control system according to the present disclosure.

First, inputting a rest mode of the front seat is performed (operation S101).

For example, a passenger seated on the front seat turns on the front seat rest mode switch 410.

Subsequently, it is confirmed whether the passenger has been seated on the rear seat (operation S102).

For example, the seat controller 420 confirms whether the passenger has been seated on the rear seat based on the sensing signals of the second passenger sensing sensor 402.

As a result of confirming whether the passenger has been seated on the rear seat, if it is confirmed that the passenger has been seated on the rear seat, a simultaneous rest mode of the rear seat is proposed (operation S103).

For example, the seat controller 420 displays a message or a voice on whether the rest mode of the rear seat has been executed in addition to the rest mode of the front seat by using a display mounted to the back surface of the front seatback.

Subsequently, the seat controller 420 confirms whether the passenger (the passenger seated on the rear seat) has agreed to the simultaneous rest mode (operation S104).

For example, the passenger seated on the rear seat reveals whether to agree through the operation such as touching the display, such that the seat controller 420 may confirm whether the passenger has agreed to the simultaneous rest mode.

If the passenger seated on the rear seat has agreed to the simultaneous rest mode, the seat controller 420 executes the simultaneous rest mode for switching both the front seat and the rear seat to the rest mode posture (operation S105).

On the other hand, if the passenger seated on the rear seat has not agreed to the simultaneous rest mode, the seat controller 420 executes a front seat single rest mode in a state where the passenger has been seated on the rear seat (operation S106).

Further, in the operation S102, as the result of confirming whether the passenger has been seated on the rear seat, if it is confirmed that the passenger has not been seated on the rear seat, the seat controller 420 executes the front seat single rest mode in a state where the passenger has not been seated on the rear seat (operation S107).

Meanwhile, inputting the rest mode of the rear seat may be performed (operation S201).

For example, the passenger seated on the rear seat turns on the rear seat rest mode switch 412.

Subsequently, it is confirmed whether the passenger has been seated on the front seat (operation S202).

For example, the seat controller 420 confirms whether the passenger has been seated on the front seat based on the sensing signals of the first passenger sensing sensor 401.

As a result of confirming whether the passenger has been seated on the front seat, if it is confirmed that the passenger has been seated on the front seat, the simultaneous rest mode is proposed (operation S203).

For example, the seat controller 420 displays a message or a voice on whether to execute the rest mode of the front seat in addition to the rest mode of the rear seat by using a display mounted to a cockpit module.

Subsequently, the seat controller 420 confirms whether the passenger (the passenger seated on the front seat) has agreed to the simultaneous rest mode (operation S204).

For example, the passenger seated on the front seat reveals whether to agree through the operation such as touching the display, such that the seat controller 420 may confirm whether the passenger has agreed to the simultaneous rest mode.

If the passenger seated on the front seat has agreed to the simultaneous rest mode, the seat controller 420 executes the simultaneous rest mode for switching both the front seat and the rear seat to the rest mode posture (operation S105).

On the other hand, if the passenger seated on the front seat has not agreed to the simultaneous rest mode, the seat controller 420 executes a rear seat single rest mode in a state where the passenger has been seated on the front seat (operation S108).

Further, in the operation S202, as the result of confirming whether the passenger has been seated on the front seat, if it is confirmed that the passenger has not been seated on the front seat, the seat controller 420 executes the rear seat single rest mode in a state where the passenger has not been seated on the front seat (operation S109).

Here, the seat control and operation process for each rest mode will be described as follows.

Simultaneous Rest Mode

Figure 6:
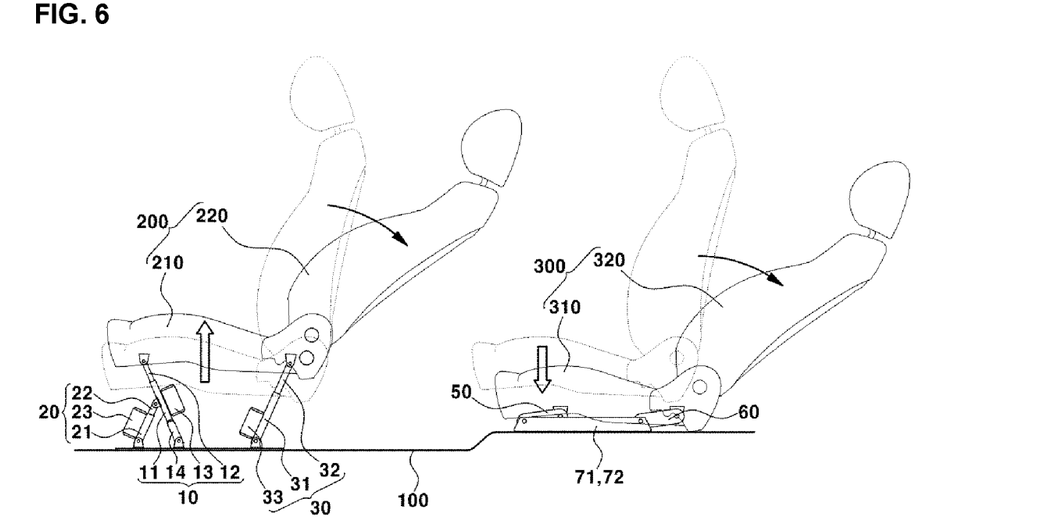
FIGS. 6 to 10 are side views illustrating operation trajectories of a front seat and a rear seat by a control of the seat control system according to the present disclosure.

FIG. 6 illustrates operation trajectories of the front seat and the rear seat in the simultaneous rest mode according to the present disclosure.

The seat controller 420 simultaneously controls the lifting operation of the front seat 200, and the lowering operation of the rear seat 300, and the backward reclining operation of the front seatback 220 and the rear seatback 320 in the simultaneous rest mode of the front seat and the rear seat.

At this time, the front seat 200 is lifted by performing, by the control of the seat controller 420, an operation in which the first piston 12 of the first actuator 10 moves forward, an operation of angularly rotating while the first actuator 10 is pushed backward by the forward movement of the second piston 22 of the second actuator 20, and an operation of angularly rotating forward while the third piston 32 of the third actuator 30 moves forward.

Further, the one-way rotational driving of the fourth actuator 40 is performed by the control of the seat controller 420, such that the first link 50 is reclined backward while the second link 60 is reclined backward, thereby lowering the rear seat 300.

Further, the motors included in the reclining devices of the front seatback 220 and the rear seatback 320 are driven by the control of the seat controller 420, thereby performing the operation of reclining the front seatback 220 and the rear seatback 320 backward.

Therefore, as illustrated in FIG. 6, since it is possible to widely secure the space capable of extending the feet and legs of the passenger seated on the rear seat 300, the passengers seated on the front seat 200 and the rear seat 300 may simultaneously take the rest posture lying comfortably.

Single Rest Mode of the Front Seat (in a State Where the Passenger Has Not Been Seated on the Rear Seat)

Figure 7:
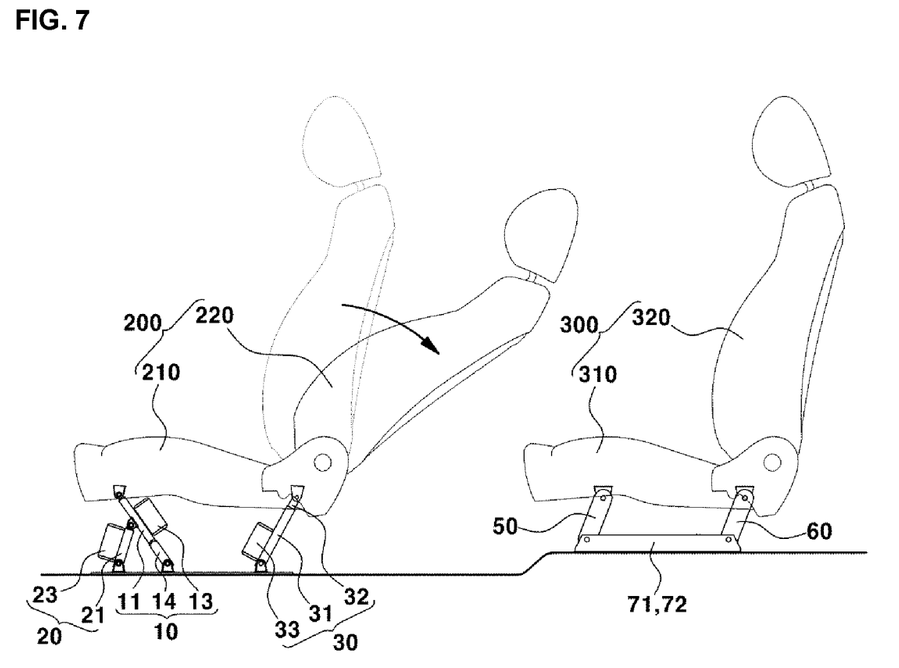

The seat controller 420 controls only the reclining operation of the front seatback 220 in the single rest mode of the front seat in a state where the passenger has not been seated on the rear seat.

As illustrated in FIG. 7, the passenger seated on the front seat 200 may take the comfortable rest posture by the backward reclining operation of the front seatback 220 in a state where the passenger has not been seated on the rear seat 300.

Single Rest Mode of the Front Seat (in a State Where the Passenger Has Been Seated on the Rear Seat)

Figure 8:
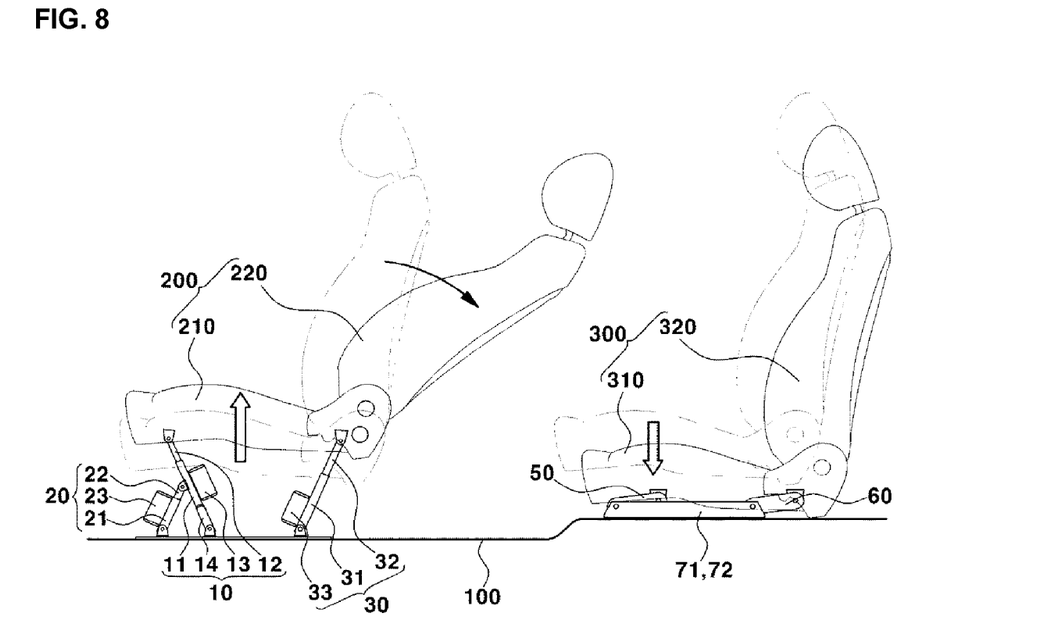

The seat controller 420 simultaneously controls the lifting operation of the front seat 200, and the lowering operation of the rear seat 300, and the backward reclining operation of the front seatback 220 in the single rest mode of the front seat in a state where the passenger has been seated on the rear seat.

At this time, the front seat 200 is lifted by performing, by the control of the seat controller 420, an operation in which the first piston 12 of the first actuator 10 moves forward, an operation of angularly rotating while the first actuator 10 is pushed backward by the forward movement of the second piston 22 of the second actuator 20, and an operation of angularly rotating forward while the third piston 32 of the third actuator 30 moves forward.

Further, the one-way rotational driving of the fourth actuator 40 is performed by the control of the seat controller 420, such that the first link 50 is reclined backward while the second link 60 is reclined backward, thereby lowering the rear seat 300.

Further, the motor included in the reclining device of the front seatback 220 is driven by the control of the seat controller 420, thereby performing the reclining operation of reclining only the front seatback 220 backward.

Therefore, as illustrated in FIG. 8, even if the backward reclining of the front seatback 220 is performed, as the rear seat 300 lowers, it is possible to prevent the interference phenomenon in which the front seatback contacts the lower body of the passenger seated on the rear seat, and further, the front seat 200 has been lifted, thereby widely securing the space capable of extending the feet and legs of the passenger seated on the rear seat.

Single Rest Mode of the Rear Seat (in a State Where the Passenger Has Not Been Seated on the Front Seat)

Figure 9:
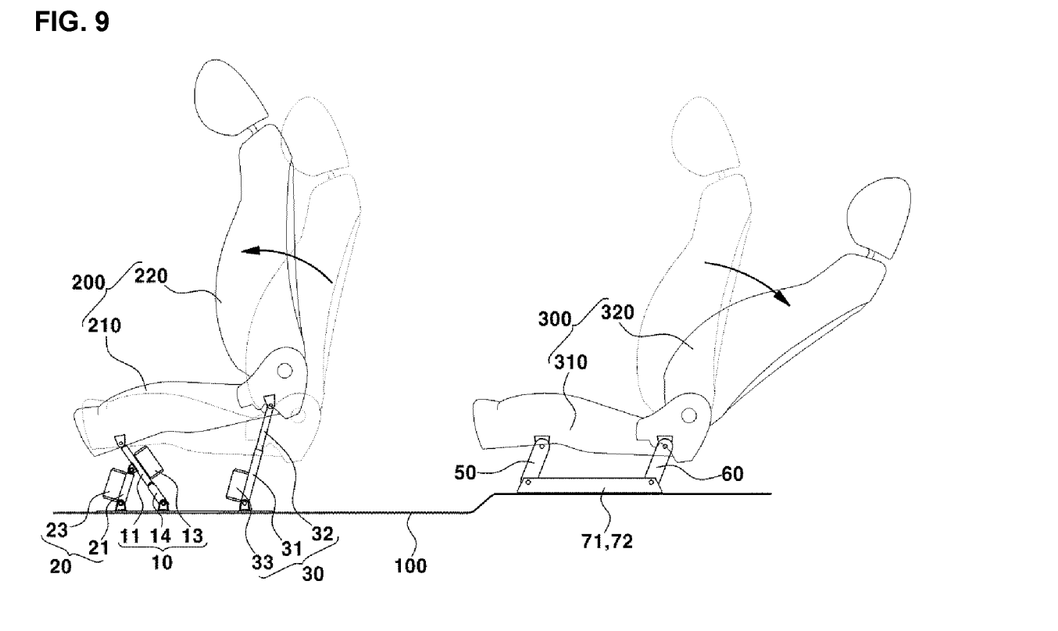

The seat controller 420 simultaneously controls the forward tilting operation of the front seat 200, and the backward reclining operation of the rear seatback 320 in the single rest mode of the rear seat in a state where the passenger has not been seated on the front seat.

At this time, the forward tilting of the front seat 200 is performed by performing, by the control of the seat controller 420, the backward movement operation of the first piston 12 of the first actuator 10, an operation of angularly rotating while the first actuator 10 is pushed forward by the backward movement of the second piston 22 of the second actuator 20, and an operation of angularly rotating forward while the third piston 32 of the third actuator 30 moves forward.

Further, the motor included in the reclining device of the rear seatback 320 is driven by the control of the seat controller 420, thereby performing a reclining operation in which the rear seatback 320 is reclined backward.

Therefore, as illustrated in FIG. 9, the passenger seated on the rear seat 300 may take the comfortable rest posture by the backward reclining operation of the rear seatback 320, and further, as the front seat 200 is tilted forward, it is possible to secure the space capable of extending the feet and legs of the passenger seated on the rear seat more widely, thereby taking more comfortable posture.

Single Rest Mode of the Rear Seat (in a State Where the Passenger Has Been Seated on the Front Seat)

Figure 10:
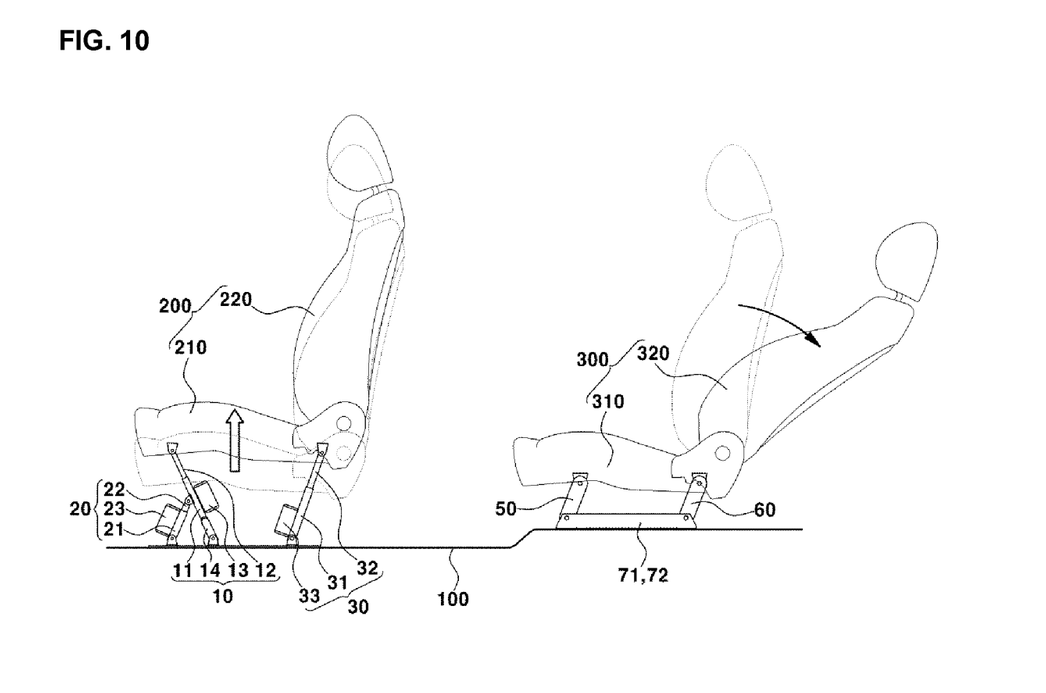

The seat controller 420 simultaneously controls the lifting operation of the front seat 200 and the backward reclining operation of the rear seatback 320 in a single rest mode of the rear seat in a state where the passenger has been seated on the front seat.

At this time, the front seat 200 is lifted by performing, by the control of the seat controller 420, an operation in which the first piston 12 of the first actuator 10 moves forward, an operation of angularly rotating while the first actuator 10 is pushed backward by the forward movement of the second piston 22 of the second actuator 20, and an operation of angularly rotating forward while the third piston 32 of the third actuator 30 moves forward.

Further, the motor included in the reclining device of the rear seatback 320 is driven by the control of the seat controller 420, thereby performing a reclining operation in which the rear seatback 320 is reclined backward.

Therefore, as illustrated in FIG. 10, the passenger seated on the rear seat 300 may take the comfortable rest posture by the backward reclining operation of the rear seatback 320, and further, as the front seat 200 is lifted, it is possible to secure the space capable of extending the feet and legs of the passenger seated on the rear seat more widely, thereby taking more comfortable posture.

Figure 5:
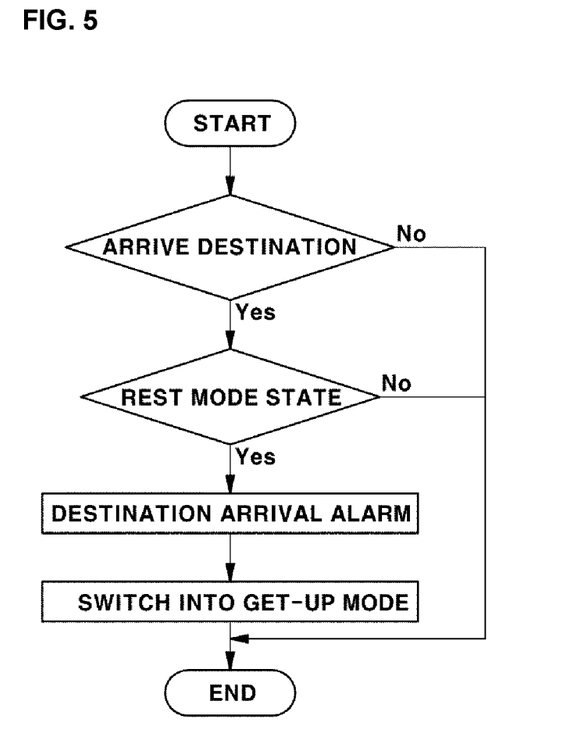

FIG. 5 is a flowchart illustrating another control process of the seat control system according to the present disclosure.

If the vehicle arrives the destination in a state where the front seat and the rear seat have been in the postures by the simultaneous rest mode, the single seat rest mode of the front seat, the single seat rest mode of the rear seat, or the like as described above during the running of the vehicle, the seat controller 420 outputs a destination arrival alarm.

For example, if the seat controller 420 receives the destination arrival information of the vehicle from a navigation device, the seat controller 420 outputs the destination arrival alarm.

Subsequently, the seat controller 420 may perform a control of returning the front seat 200 and the rear seat 300 from the respective rest mode postures to their original postures as illustrated in FIG. 2, thereby inducing the sleep state of the passenger to the get-up state thereof.

Referring back to FIG. 3, the seat controller 420 may include a CPU such as a processor or a microprocessor and a memory. The aforementioned operations/functions performed by the seat controller can be embodied as computer readable code/algorithm/software stored on the memory which may include a computer readable recording medium. The computer readable recording medium is any data storage device that can store data which can thereafter be read by the CPU. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The CPU may perform the above described operations/functions, by executing the computer readable code/algorithm/software stored on the computer readable recording medium.

Although the present disclosure invention was described with reference to specific embodiments shown in the drawings, it is apparent to those skilled in the art that the present disclosure invention may be changed and modified in various ways without departing from the scope of the present disclosure, which is described in the following claims.

What is claimed is:

1. A seat control system for a vehicle, comprising:
   a first actuator hinge-connected between a floor panel and
      a front bottom surface of a front seat cushion;

a second actuator hinge-connected between the floor panel and the first actuator;
a third actuator connected between a back bottom surface of the front seat cushion and the floor panel;
a first link hinge-connected between the floor panel and a front bottom surface of a rear seat cushion;
a second link hinge-connected between the floor panel and a back bottom surface of the rear seat cushion;
a fourth actuator connected to deliver rotational power to a hinge shaft of the second link; and
a control module for sensing whether passengers have been seated on a front seat and a rear seat, and driving and controlling one or more among the first to fourth actuators for a height adjustment, a reclining adjustment, or a tilting operation of one or more of the front seat and the rear seat according to the sensed result.

2. The seat control system for the vehicle of claim 1, wherein the first actuator comprises a first cylinder body, a first piston embedded to be movable forward and backward in the first cylinder body to be hinge-fastened to the front bottom surface of the front seat cushion, a first motor mounted to the first cylinder body to provide a forward and backward driving force to the first piston, and a support link branched from a lower portion of the first cylinder body to be hinge-fastened to the floor panel.

3. The seat control system for the vehicle of claim 2, wherein the second actuator comprises a second cylinder body hinge-fastened to the floor panel, a second piston embedded to be movable forward and backward in the second cylinder body to be hinge-fastened to the first cylinder body of the first actuator, and a second motor mounted to the second cylinder body to provide a forward and backward driving force to the second piston.

4. The seat control system for the vehicle of claim 1, wherein the third actuator comprises a third cylinder body hinge-fastened to the floor panel, a third piston embedded to be movable forward and backward in the third cylinder body to be hinge-fastened to the back bottom surface of the front seat cushion, and a third motor mounted to the third cylinder body to provide a forward and backward driving force to the third piston.

5. The seat control system for the vehicle of claim 1, wherein the fourth actuator is adopted as a motor mounted to the floor panel to deliver the rotational power to the hinge shaft of the second link.

6. The seat control system for the vehicle of claim 1, wherein the control module comprises:
a first passenger sensing sensor mounted to the front seat to sense whether a first passenger has been seated thereon;
a first seat posture sensing sensor for sensing a current posture of the front seat;
a second passenger sensing sensor mounted to the rear seat to sense whether a second passenger has been seated thereon;
a second seat posture sensing sensor for sensing a current posture of the rear seat; and
a seat controller for driving and controlling one or more among the first to fourth actuators for the height adjustment, the reclining adjustment, and the tilting operation of one or more of the front seat and the rear seat based on sensing signals of the first and second passenger sensing sensors and sensing signals of the first and second seat posture sensing sensors.

7. The seat control system for the vehicle of claim 6, wherein the seat controller is configured to drive and control one or more among the first to fourth actuators for the height adjustment, the reclining adjustment, and the tilting operation of one or more of the front seat and the rear seat based on sensing signals of the first and second passenger sensing sensors and sensing signals of the first and second seat posture sensing sensors, after receiving an input signal of a front seat rest mode switch and a rear seat rest mode switch.

8. The seat control system for the vehicle of claim 6, wherein the first and second passenger sensing sensors are adopted as a seat belt wearing sensing sensor for sensing whether to wear a seat belt.

9. The seat control system for the vehicle of claim 6, wherein the first and second seat posture sensing sensors are adopted as hall sensors included in motors of the first to fourth actuators.

10. The seat control system for the vehicle of claim 6, wherein in a simultaneous rest mode of the front seat and the rear seat,
the seat controller is configured to:
control, for lifting the front seat, an operation in which a first piston of the first actuator moves forward, an operation of angularly rotating while the first actuator is pushed backward by a forward movement of a second piston of the second actuator, and an operation of angularly rotating forward while a third piston of the third actuator moves forward,
control a one-way rotational driving of the fourth actuator so that the first link is reclined backward while the second link is reclined backward for lowering the rear seat, and
control a reclining operation of a front seatback of the front seat and a rear seatback of the rear seat.

11. The seat control system for the vehicle of claim 6, wherein in a single rest mode of the front seat in a state where the second passenger has not been seated on the rear seat,
the seat controller is configured to control only a reclining operation of a front seatback of the front seat.

12. The seat control system for the vehicle of claim 6, wherein in a single rest mode of the front seat in a state where the second passenger has been seated on the rear seat,
the seat controller is configured to:
control, for lifting the front seat, a forward movement operation of a first piston of the first actuator, an operation of angularly rotating while the first actuator is pushed backward by the forward movement of a second piston of the second actuator, and an operation of angularly rotating forward while a third piston of the third actuator moves forward,
control a reclining operation of a front seatback of the front seat, and
control a one-way rotational driving of the fourth actuator so that the first link is reclined backward while the second link is reclined backward for lowering the rear seat.

13. The seat control system for the vehicle of claim 6, wherein in a single rest mode of the rear seat in a state where the first passenger has not been seated on the front seat,
the seat controller is configured to:
control, for forward tilting the front seat, a backward movement operation of the first piston of the first actuator, an operation of angularly rotating while the first actuator is pushed forward by the backward movement of the second piston of the second actuator, and an operation of angularly rotating forward while the third piston of the third actuator moves forward, and control a reclining operation of a rear seatback of the rear seat.

14. The seat control system for the vehicle of claim 6, wherein in a single rest mode of the rear seat in a state where the first passenger has been seated on the front seat, the seat controller is configured to:

control, for lifting the front seat, a forward movement operation of the first piston of the first actuator, an operation of angularly rotating while the first actuator is pushed backward by the forward movement of the second piston of the second actuator, and an operation of angularly rotating forward while the third piston of the third actuator moves forward, and control a reclining operation of a rear seatback of the rear seat.

15. The seat control system for the vehicle of claim 6, wherein the seat controller is configured to perform a control of returning the front seat and the rear seat from rest mode postures to original postures, in the case of receiving destination arrival information of the vehicle.

* * * * *